United States Patent
Campbell et al.

(10) Patent No.: US 6,552,885 B1
(45) Date of Patent: Apr. 22, 2003

(54) GROUND FAULT CIRCUIT HAVING CIRCUIT FAILURE SENSOR, AND METHOD

(75) Inventors: John S. Campbell, Fonthill (CA); Sergio A. R. Panetta, Brampton (CA)

(73) Assignee: IPC Resistors Inc., Mississauga (CA)

( * ) Notice: Subject to any disclaimer, the term of this patent is extended or adjusted under 35 U.S.C. 154(b) by 239 days.

(21) Appl. No.: 09/656,328

(22) Filed: Sep. 6, 2000

(51) Int. Cl.[7] .............................. H02H 3/16; H02H 3/26
(52) U.S. Cl. ........................................... 361/45; 361/64
(58) Field of Search .......................... 361/45, 64, 113, 361/42

(56) References Cited

U.S. PATENT DOCUMENTS

| | | | |
|---|---|---|---|
| 3,936,699 A | * | 2/1976 | Adams .................. 361/113 |
| 4,024,436 A | * | 5/1977 | Adams .................. 361/113 |
| 4,151,460 A | * | 4/1979 | Seese et al. .............. 324/509 |
| 5,867,358 A | | 2/1999 | Campbell ................... 361/47 |
| 6,014,297 A | * | 1/2000 | Clarey et al. ............... 361/115 |
| 6,122,157 A | * | 9/2000 | Gerlach .................... 361/111 |
| 6,188,552 B1 | * | 2/2001 | Jaeschke et al. ........... 361/111 |
| 6,285,534 B1 | * | 9/2001 | Gibson et al. .............. 361/42 |
| 6,356,426 B1 | * | 3/2002 | Dougherty ............... 361/102 |
| 6,377,427 B1 | * | 4/2002 | Haun et al. ................ 361/42 |
| 6,392,513 B1 | * | 5/2002 | Whipple et al. ............ 335/18 |

* cited by examiner

*Primary Examiner*—Bao Q. Vu
(74) *Attorney, Agent, or Firm*—Cesari and McKenna, LLP

(57) ABSTRACT

A ground fault circuit for a poly-phase circuit is disclosed. The ground fault circuit provides a plurality of current limiting impedance paths from a neutral of the poly-phase circuit to ground. A sensing circuit monitors the paths and may indicate failure of one of the paths. The sensing circuit, may, for example sense the net impedance of the plurality of paths and note an alarm in the event of an increased or decreased impedance, indicative of an open or short circuit along either path.

11 Claims, 2 Drawing Sheets

GROUND FAULT CIRCUIT HAVING CIRCUIT FAILURE SENSOR, AND METHOD

FIELD OF THE INVENTION

The present invention relates to ground fault circuits, and more particularly to an improved ground fault circuit that is less prone to failure.

BACKGROUND OF THE INVENTION

In modern electric power generation and distribution systems, polyphase alternating current (AC) is typically generated and distributed. A number of AC sources producing equal voltages at the same frequencies, at fixed but different phase angles provide the power. In an n-phase system, n voltage source are interconnected. Each voltage source produces a sinusoidally varying voltage of fixed magnitude. The phase angle associated with each generated voltage source varies from another by $2\pi/n$ radians.

Conveniently, the n voltage sources may be interconnected to each other at a common point. Modern power distribution systems are typically three phase. In a three phase system, voltage sources and sinks that are connected at a common point are said to be connected in a "wye configuration" or a "star configuration". Alternatively, in a three phased circuit the voltage source or sinks may be connected in a "delta configuration".

While it is possible to interconnect multiple sources in poly-phase systems in a number of ways, the wye configuration is generally desirable in three phased systems. Specifically, for safety and other reasons, it is desirable to electrically connect the poly-phase system to ground. Wye connected sources provide a logical connection point for ground, namely the common or neutral point of the n voltage sources.

As is well understood, if one of the loads suffers a fault, caused for example by a machine fault, an excess amount of current is drawn by a single phase of the circuit. This excess current may impact on the current provided to the remaining phases. If the common point of the circuit is connected to ground much of the fault current will flow from or to the ground connection. In order to limit the amount of fault current flowing from or to ground, the neutral point is often connected to ground by way of a ground fault circuit that limits the current. Such a ground fault circuit may be formed by an impedance that limits the current through the neutral point.

Typically, such a ground fault circuit provides a single path for ground fault current to travel from the neutral point from or to ground. Moreover, typically such a ground fault circuit is unmonitored. Detection of a failure of the ground fault circuit is thus difficult. Of course, in the absence of a functioning ground fault circuit ground fault current may again significantly impact on the provision of current to functioning phases of the system or result in unlimited current to ground.

Accordingly, an improved ground fault circuit that may be monitored and that is robust is desirable.

SUMMARY OF THE INVENTION

In accordance with an aspect of the present invention, a ground fault circuit provides two current limiting paths from a neutral of a poly-phase circuit to ground. A sensing circuit monitors the paths and may indicate failure of either path. The sensing circuit, may, for example sense the net impedance of both paths and note an alarm in the event of an increased impedance, indicative of an open circuit along either path.

Advantageously, the two paths provide redundancy. In the event one path fails, the other continues to provide a path for ground fault current, and thereby limits total current to ground.

Similarly, in accordance with another aspect of the present invention, a ground fault circuit provides a plurality of current limiting paths from a neutral of a poly-phase circuit to ground. A sensing circuit monitors the plurality of paths and may indicate failure of one path. The sensing circuit, may, for example sense the net impedance of all paths and note an alarm in the event of an increased impedance, indicative of an open circuit along a path.

In accordance with yet another aspect of the present invention, a method of sensing failure of a ground fault circuit includes monitoring a net impedance of the ground fault circuit having a plurality of parallel current paths, in operation; and sensing failure of the ground fault circuit upon monitoring a change in impedance of the ground fault circuit indicative of a failure of at least one of the current paths.

DETAILED DESCRIPTION

Figure 1:
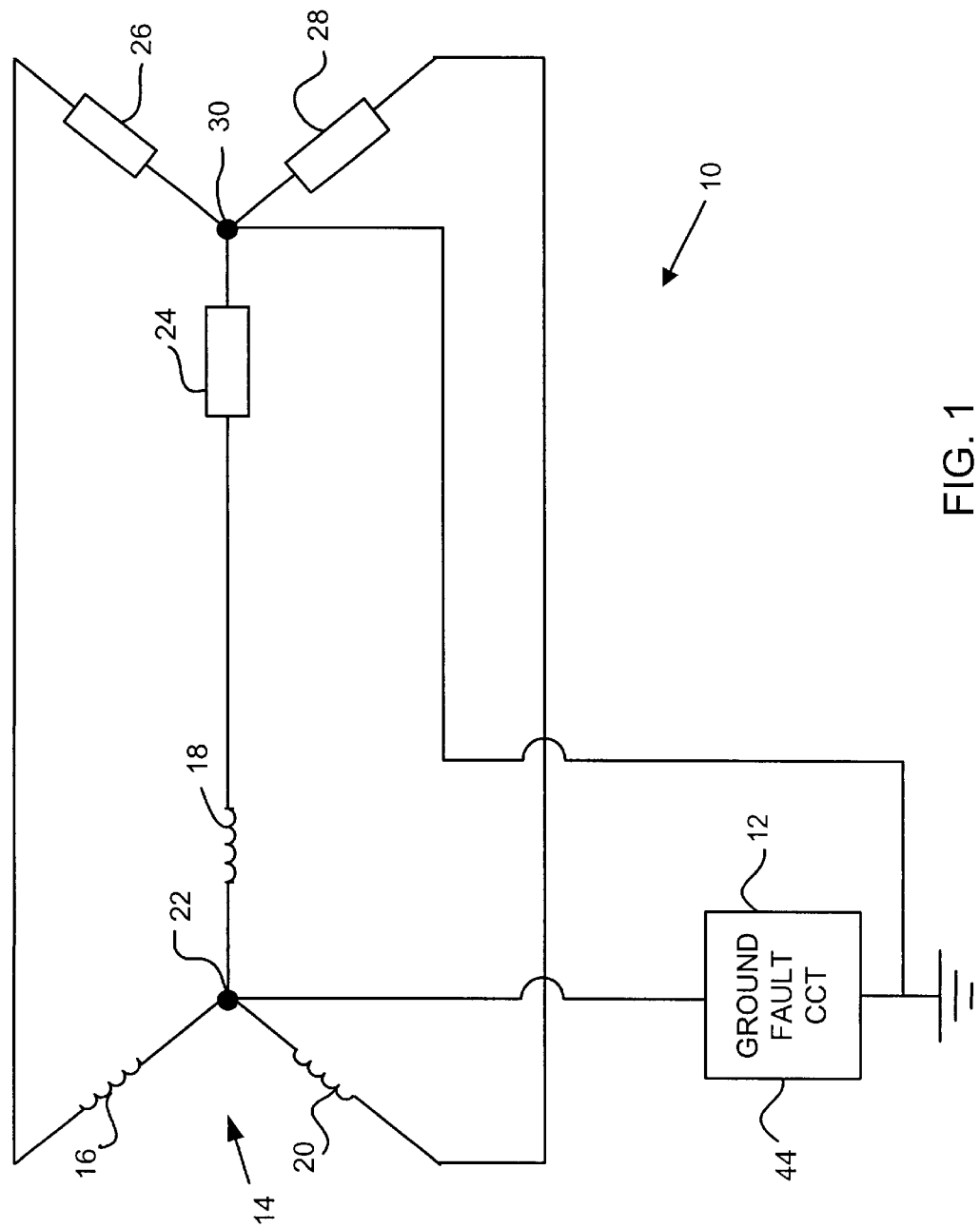
FIG. 1 is a schematic diagram of a poly-phase circuit, including a ground fault circuit exemplary of an embodiment of the present invention.

FIG. 1 illustrates a poly-phase circuit 10 including a ground fault circuit 12, exemplary of an embodiment of the present invention.

As illustrated, example poly-phase circuit 10 includes a three-phase source 14 having outputs connected in a wye configuration. As illustrated, source 14 includes exemplary windings 16, 18 and 20 interconnected at a neutral node 22. Source 14 may, for example, be the secondary windings of a three-phased transformer. Outputs of windings 16, 18 and 20 are connected to loads 24, 26 and 28. As illustrated loads 24, 26, and 28 are preferably also connected in a wye configuration. Loads 24, 26 and 28 are interconnected to each other at neutral node 30.

As will be appreciated, loads 24, 26 and 28 are typically balanced or near balanced so that the net current flowing from source 14 is near zero. This being so, the net current through node 30 will also be near zero. Circuit 10 is thus said to be balanced.

Exemplary ground fault circuit 12 is preferably interconnected between neutral node 22 and ground. As will be appreciated, loads 24, 26, 28 could be interconnected in a delta configuration. Similarly, source 14 could be a delta configured source, including an additional conventional transformer providing a neutral node for source 14.

Figure 2:
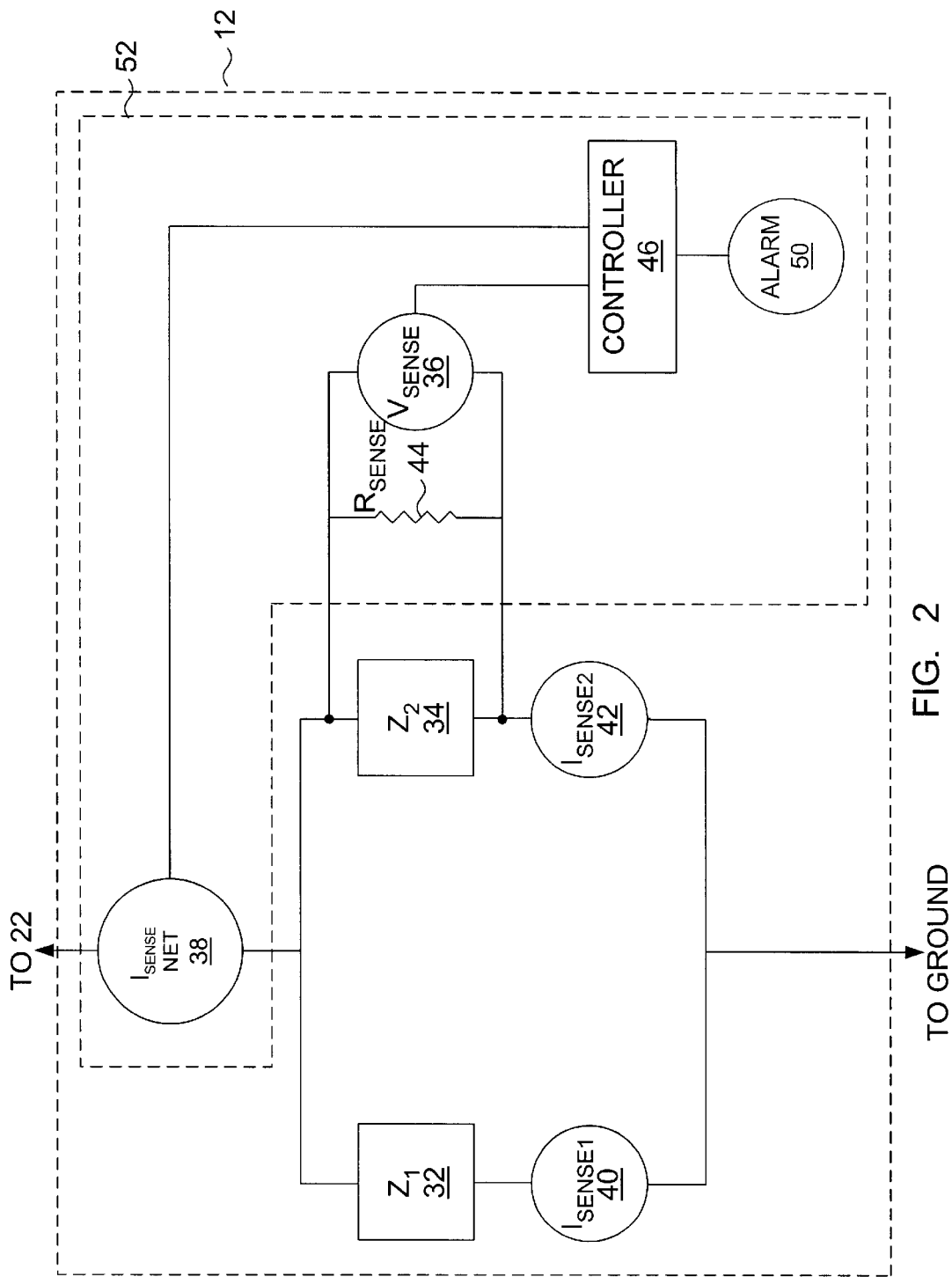
FIG. 2 is a schematic diagram of an exemplary ground fault circuit illustrated in FIG. 1

Exemplary ground fault circuit 12 is illustrated in FIG. 2. As illustrated, circuit 12 preferably includes two parallel connected impedances 32 and 34 and a sensing circuit 52 adapted to monitor impedances 32 and 34. Impedances 32 and 34 are preferably equal valued resistors.

Sensing circuit 52 includes a voltage and current sensor 36 and 38. Voltage sensor 36 is connected across the parallel combination of impedance 36 and 38 to measure voltage across them. Current sensor 38 measures the total current through node 22 to ground and therefore through parallel combination of impedances 32 and 34, without inhibiting the flow of current through these impedances.

The input impedance of voltage sensor 36 is governed by sense resistor 44. Sense resistor 44 is preferably chosen so that the voltage sensed across voltage sensor 36 in normal operation and in the presence of a fault is very small compared to the actual voltage across impedances 32 and 34. Typically, the value of sense resistor 44 is chosen depending on the steadystate operating voltage of circuit 10. The higher the operating voltage, the greater the value of sense resistor 44 so that the current drawn by sensor 36 (and the resulting voltage across it) is limited. Appropriate values of sense resistor 44 may be 960 kΩ for a 416 V (line to line) poly-phase circuit; 2308 kΩ for a 10 kV (line to line) circuit; and 3186 kΩ for a 13.8 kV(line to line) circuits. Persons smiled in the art will readily appreciate other suitable values of sense resistor 44.

Outputs of voltage and current sensors 36 and 38 are preferably provided to programmable controller 46, that is loaded with software instructions to function in manners exemplary of an embodiment of the present invention. Controller 46 is preferably any suitable industrial controller capable of taking as its inputs two digital signals representative of sensed voltage and current. The digital signals may be provided to controller 46 from analog to digital converters (not specifically illustrated) internal or external to controller 46 which interconnect controller 46 with sensors 36 and 38. Additionally, an output port of controller 46 may be interconnected with alarm 50 to energize alarm 50. Example alarm 50 may be a visible or audible indicator, such as a light or siren. Of course, a person skilled in the art will readily recognize that controller 46 and alarm 50 may be replaced by any number of similar circuits that may be used to compare sensed voltage and current as described.

Optionally, additional current sensors 40 and 42 may additionally sense current through the individual impedances 32 and 34.

In normal operation, in the absence of a fault, a potential is generated across windings 16,18 and 20 illustrated in FIG. 1 that provides three phase current provided to loads 24, 26 and 28. As noted, potential across windings 16, 18 and 20 are preferably out of phase by $2\pi/3$ radians. Loads 24, 26 and 28 are preferably balanced so that the net current provided to loads 24, 26 and 28 (i.e. the phaser sum of currents provided to loads 24, 26 and 28) is zero or near zero in normal operation. As will be appreciated, perfect balancing of loads 24, 26 and 28 is very difficult in practice, for several reasons. For example, the impedances of loads 24, 26 and 28 may vary; they may be non-linear and therefore introduce harmonics in circuit 10; or they may themselves leak small amounts of currents to ground. As such, the net current through these loads 24, 26 and 28 typically approaches, but does not equal zero. Current through nodes 30 equals the sum of the currents through these loads, and will accordingly also approximate zero. Current through node 22 and through circuit 12 mirrors current through node 30.

So, voltage across circuit 12 and the corresponding current should theoretically approximate zero. Current sensor 38 and voltage sensor 36 therefore reflect this near zero value. Now, in the event of a ground fault as, for example, caused by a failure of one or more of load 24, 26 or 28, circuit 10 is no longer balanced, and a net current will flow through node 30 and node 22. This current is typically referred to as a ground fault current. This current will also flow through ground fault circuit 12. As noted, ground fault circuit 12 includes two impedances 32 and 34, establishing two current paths from node 22 to ground. As impedances 32 and 34 are preferably equal valued resistors, these may establish two equal current paths to ground. Most preferably, both resistors are capable of dissipating sufficient power so that either resistor alone could shunt ground fault current resulting from the ground fault, without being damaged and therefore operate in redundancy.

Sensors 36 and 38 may detect a ground fault by detecting an increased voltage drop across parallel impedances 32 and 34 (as sensed by voltage sensor 36), or an increased net current through node 22 (as sensed by current sensor 38). Of course the measurement of voltage sensor 36 divided by the measured current, as measured by sensor 36 should reflect the impedance of parallel combination of impedances 32 and 34, and any additional parallel impedance to ground, as may be present as a result of loads 24, 26 and 28.

Of course, the failure of a ground fault circuit formed of a single current path to ground is not uncommon. As two impedances 32 and 34 are connected in parallel, ground fault circuit 12, exemplary of an embodiment of the present invention, effectively provides redundancy. In the event either of impedance 32 or 34 fails and results in an open circuit, the other impedance 34 or 32 provides a single path to ground that will be sufficient to shunt a rated fault. Such a failure, may in turn be detected by the combination of voltage and current sensors 36 and 38. Thus, the ratio of detected voltage to current will increase reflecting an increased resistive path between node 22 and ground. In the presence of an open circuit of one of impedance 32 and 34 this ratio will equal the value of a single one of impedance 32 and 34. Similarly, in the event either impedance 32 or 34 fails and becomes a short circuit, voltage sensor 36 may sense the reduced impedance of the parallel combination of these impedances 32 and 34.

Voltage and current sensors 36 and 38 may be interconnected with any conventional circuit or more complex device in order to detect a failure of one of impedances/resistors 32 and 34, and initiate an indicator of a failure. As illustrated, in the exemplary embodiment, voltage and current sensors 36 and 38 are interconnected with a programmable controller 46, taking the outputs of these sensors 36 and 38 as inputs. The outputs of voltage and current sensors 36 and 38 may, for example, be provided to suitable analog to digital converters forming part of controller 46 that may compare sensed voltage to current in order to initiate any alarm. Controller 46 may be programmed to scale sensed current and voltage to give determine an accurate value of the combined impedance of the parallel combination of impedances 32 and 34. In the event the sensed current through current sensor 38 decreases by a programmed factor, without a corresponding decrease in sensed voltage at sensor 36, controller 46 may initiate an appropriate alarm. An alarm may, for example, issue if current is reduced by a factor of two, without corresponding drop in voltage. Similarly, a reduced voltage across sensor 36 may reflect a short circuit in one of impedance 32 and 34. Controller 46 may initiate an alarm by energizing an output powering alarm 50, which in turn may emit a visible or audible alarm.

Alternatively outputs of current sensor 38 and voltage sensor 36 could be compared without a programmable controller. For example, the output of current sensor 38 could be scaled by a value equal to the net impedance of the parallel combination of impedances 32 and 34. The scaled sensed current may be compared to the voltage sensed by sensor 36 to ensure that the sensed voltage and scaled sensed current are about equal. In response to sensing a difference or otherwise sensing failure of either impedance 32 or 34, a circuit interconnected to sensors 36 and 38 may initiate an alarm that may be visible or is audible, so that ground fault circuit 12 may be serviced. For example, sensed current and voltages may be provided to a trip relay made available by Patton and Cooke of Surrey, British Columbia under model number 11K RGM. Such a trip relay receives as inputs sensed voltage and current and may be adjusted if the ratio of sensed voltage to current exceeds a pre-programmed resistance by a pre-programmed margin.

Optional current sensors 40 and 42 sense current through individual impedances 32 and 34. Failure of either impedance 32 or 34 may alternatively be detected by sensing an imbalance of current through sensors 40 and 42. Again, outputs of these sensors may be connected to a suitable difference sensing and alarm circuit, such as controller 46 and alarm 50.

As should now be appreciated, ground fault circuit 12 could easily be formed using a plurality of more than two parallel current paths from node 22 to ground. Controller 46 could be suitably adapted to detect failure of a single path by sensing voltage across, and total current through, the plurality of paths and thereby monitor the overall impedance of the parallel paths. Failure of a single path could then cause controller 46 to trigger an alarm indicative of a failure. Of course, as a failure of a single path in a plurality of paths may vary the total impedance path minimally, controller 46 would need to be suitably adapted to detect the varied impedance without generating false alarms for ground fault current fluctuations.

Alternatively, controller 50 could be in communication with a second controller (not shown). This second controller could, in turn, vary the impedance of the remaining current path to facilitate detection and location of a failed ground fault circuit. The impedance of the remaining current path could be varied by this controller, by switching an additional impedance in parallel between node 22 and ground. By periodically connecting and disconnecting (i.e. strobing) this additional impedance, the faulty circuit 12 may easily be detected.

The above described ground fault circuit could also be combined with the fault current limiting circuit described in U.S. Pat. No. 5,867,358, the contents of which are hereby incorporated by reference. Circuit 12 could be used in place of the conventional current limiting resistor used as part of the dual state fault current limiting circuit described in this patent. This combination would then allow for a current limiting circuit, having a monitored ground fault circuit with multiple current paths, as described.

It will be further understood that the invention is not limited to the embodiments described herein which are merely illustrative of a preferred embodiment of carrying out the invention, and which are susceptible to modification of form, arrangement of parts, step details and order of operation. The invention, rather, is intended to encompass all such modification within its spirit and scope, as defined by the claims.

What is claimed is:

1. A ground fault circuit, comprising:
   a first and second impedance for connecting a neutral point of a poly-phase circuit to ground, to limit fault current through said neutral point to ground;
   a sensing circuit interconnected with said first and second impedance for sensing a value indicative of a combined impedance of said first and second impedance, in order to sense failure of one of said first and second impedance.

2. The circuit of claim 1, wherein said first and second impedance are interconnected to each other in parallel to be connected between said neutral point and ground to provide first and second paths between said neutral point and ground.

3. The circuit of claim 1, wherein said sensing circuit comprises first and second sensors for sensing a voltage across said first and second impedance and a total current through said first and second impedance.

4. The circuit of claim 3, wherein said sensing circuit detects a failure of one of said first and second impedance by detecting an increased combined impedance, reflecting a failure of one of said first and second impedance.

5. The circuit of claim 4, wherein said sensing circuit detects a failure by sensing a combined impedance approximately equaling one of said first and second impedance, reflecting an open circuit of the other one of said first and second impedance.

6. The circuit of claim 5, further comprising an alarm interconnected with said sensing circuit, in order to indicate failure of one of said first and second impedance.

7. The circuit of claim 3, further comprising comprises additional first and second current sensors for sensing current through said first and second impedances individually.

8. A poly-phase circuit comprising:
   a plurality of inductive windings interconnected at a neutral point,
   a ground fault circuit, comprising:
      a first and second impedance connecting said neutral point to ground, to limit fault current through said neutral point to ground;
      a sensing circuit interconnected with said first and second impedance for sensing a value indicative of a combined impedance of said first and second impedance, in order to sense failure of one of said first and second impedance.

9. A ground fault circuit, comprising:
   a first and second impedance for connecting a neutral point to ground, to limit fault current through said neutral point to ground;
   a first current sensor for sensing current through said first impedance;
   a second current sensor for sensing current through said second impedance;
   said first and second current sensors interconnected to each other to detect changes in current through said first and second impedances, indicative of a failure of one of said first and second impedances.

10. A ground fault circuit, comprising:
    a plurality of parallel impedances for interconnecting a neutral point of a poly-phase circuit to ground, to limit fault current through said neutral point to ground;
    a sensing circuit interconnected with said plurality of impedances for sensing a value indicative of a combined impedance of said plurality of impedances, in order to sense failure of at least one of said plurality of impedances.

11. A method of sensing failure of a ground fault circuit comprising:
    monitoring a net impedance of said ground fault, said ground fault circuit having a plurality of parallel current paths, in operation; and
    sensing failure of said ground fault circuit upon monitoring a change in impedance of said ground fault circuit indicative of a failure of at least one of said current paths.

* * * * *